July 22, 1924.

R. P. AKINS ET AL 1,502,004

GAS AND LIQUID CONTACT DEVICE

Filed June 19, 1920

INVENTOR.
R. P. AKINS
J. W. BUCHER
F. D. GROSS.
BY Spear Middleton Donaldson & Hall
ATTORNEY.

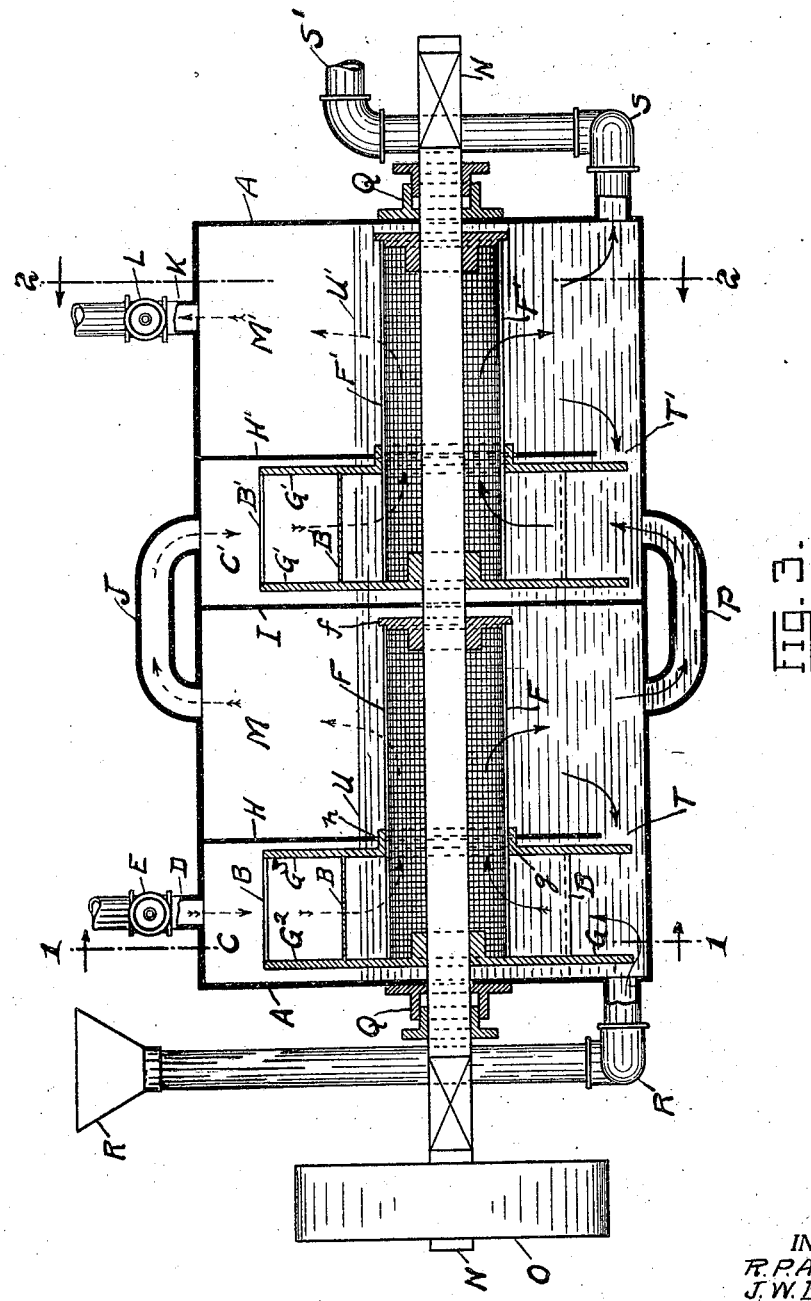

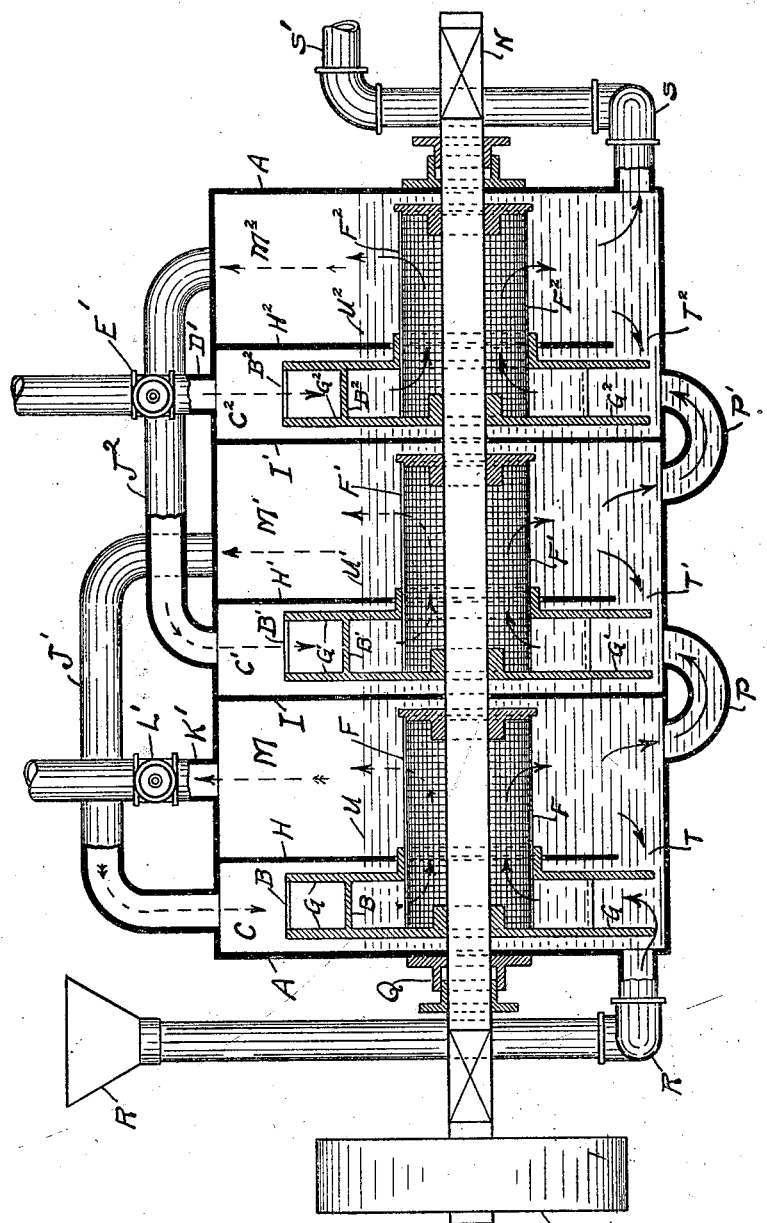

Patented July 22, 1924.

1,502,004

UNITED STATES PATENT OFFICE.

RANDALL PORTER AKINS, JOHN WILLIAM BUCHER, AND FREDERICK DANIEL GROSS, OF DENVER, COLORADO.

GAS AND LIQUID CONTACT DEVICE.

Application filed June 19, 1920. Serial No. 390,204.

*To all whom it may concern:*

Be it known that we, RANDALL P. AKINS, JOHN W. BUCHER, and FREDERICK D. GROSS, citizens of the United States, and residents of Denver, Colorado, have invented certain new and useful Improvements in Gas and Liquid Contact Devices, of which the following is a specification.

Our present invention relates to an improved method of securing intimate contact of liquids with gases, and to a novel apparatus for carrying out such a method.

The invention aims to provide a method which will secure a very intimate mixture of the liquid and gas, which may be economically practised and which is capable of easy and accurate regulation as to proportions to produce the best results according to the material operated upon.

The invention further aims to provide a simple, economical and efficient form of apparatus for carrying out the method above referred to. With these and other objects in view the invention includes the novel method of procedure and apparatus for carrying out said method as hereinafter described and particularly defined by the appended claims.

Our improved apparatus is illustrated in the accompanying drawings in which—

Figure 3 is a longitudinal vertical section, and

Figure 4 is a view similar to Figure 3 showing a modified form of apparatus.

Figure 1:
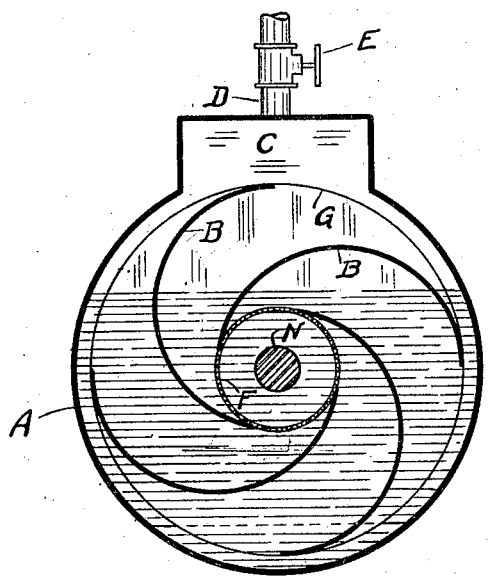
Figure 1 is a transverse sectional view through the tank and rotor, taken on line 1—1 of Figure 3.

Referring by reference characters to these drawings, A designates a tank which is preferably divided into two separate portions or units by a partition I to provide a two stage treatment apparatus which is so shown for convenience, it being understood that this is merely representative of any number of stages from one up to any desired number.

Each of these units is again divided by partitions H, H' into two chambers or compartments designated C and M and C' and M' respectively, which are in communication at their bottoms by ports or passages T T' formed in the walls H H'. The compartments are closed, except for the inlet and outlet ports or passages hereinafter described. Liquid is supplied to the tank by a suitable supply pipe such as indicated at R, communicating preferably with compartment C near the bottom thereof, and a liquid outlet is provided from the bottom of the compartment M, which in a two stage treatment apparatus would be in the shape of a pipe, port, or passage P placing the bottom of the compartment or chamber M of the first unit in communication with the bottom of the chamber C' of the second unit.

A final liquid outlet is shown at S, which has a delivery portion S' elevated sufficiently to maintain the liquid in the various compartments at a determined level as indicated at U U'.

A pipe D communicates with the chamber or compartment C, said pipe being provided with a valve E for regulating the amount of air admitted to said chamber, and the gas space of compartment or chamber M is provided with a gas outlet which, in a multi-stage treatment apparatus, communicates with the chamber C' of the next succeeding unit as indicated at J.

A final gas outlet is provided as indicated in connection with the chamber M' at K and this is provided with a regulating valve L.

The compartments or chambers C and C' may be termed suction compartments, and the compartments or chambers M M' impregnation compartments. In each suction compartment is located a vertically disposed rotor G, G' which has substantially spiral passages leading from the periphery towards the center, the rotor being so arranged relative to the liquid level that its upper portion projects above the surface of the liquid while the major portion is submerged. Such rotor may be conveniently formed of two side plates or discs $G^2$ $G^3$ the former being secured to or fast on a shaft N journalled in the walls of the tank and carrying, exteriorly of the tank, any suitable means by which the shaft may be rotated, such for example as the drive pulley O. The side plates or discs $G^2$ $G^3$ are connected by the transverse members or webs B which are spirally arranged so as to form therebetween the spirally arranged passages above referred to. The members or webs terminate at their inner ends in a cylindrical screen member or reticulated part F to which they are attached, this screen member encircling the shaft N at a suitable distance therefrom so as to leave an intervening space or annular channel. One end of the screen member is attached to the disc G² in any suitable manner and the disc G³ is provided with a hollow hub portion $g$ through which the screen is projected and to which hub portion the screen is secured in any suitable manner. The partition H is provided with an opening $h$ in which the hub rotates, the screen projecting through this opening into and substantially across the chamber M. The other end of the screen, the right hand end, Fig. 3 is supported by a hub or disc $f$, suitably secured to the screen and to the shaft.

In a multi-stage treatment apparatus it is preferable to have the successive units arranged side by side and the compartments formed by division plates in a single unitary tank, the shaft extending continuously through the several units, but obviously this is a matter of convenience only.

Figure 2:
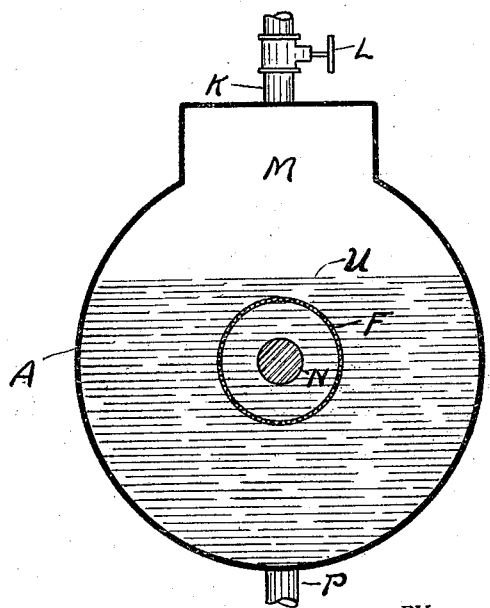
Figure 2 is a similar view taken on line 2—2 of Figure 3.

Such an apparatus as described in connection with Figures 1, 2 and 3 is particularly adapted for carburetting air by the contact of air with a volatile hydrocarbon oil, such for example as producing illuminating or power gas by the contact of air with a hydrocarbon oil.

The method of operation as used for this purpose may be briefly described as follows:

The hydrocarbon oil would be supplied to the apparatus through the feed pipe R and allowed to rise to the liquid level U above the center of the rotor, thus producing a liquid seal between the compartments C and M of the tank A. Air is admitted to compartment C by means of the pipe D and controlled by the regulating valve E. This air is entrapped by the vanes B of the rotor, between the sides G of the rotor, and by the proper rotation of the rotor, definite quantities of air and liquid are successively isolated and commingled and passed into the interior of the perforated member F at the center of the rotor, thence along the axis of the rotor and outward through the perforated member F into the compartment M, thus thoroughly breaking up the air into very small bubbles, causing an intimate intermixture of the air and liquid, and resulting in a thorough carburetion. Any carburetted air thus formed is free to pass from the first compartment M into the second compartment C' through the pipe J. Definite portions of this carburetted air are then isolated and entrapped together with similar portions of the liquid, and again passed toward the center of the second rotor and through its perforated member F' and along the axis of the machine and outward through the perforated member F' into the second carbureting chamber M'. The carbureted air from the first compartment M is thus enriched by being given a second carburetting, and as many cells as desired may be used to produce a mixture as rich in volatile hydrocarbon as may be required. The pipe P connects the lower portion of the compartment M with the lower portion of compartment C' permitting the liquid to pass from compartment M into the rotor compartment C'. The liquid level in the tank is regulated by means of the exit pipe S. The carbureted air is taken from the compartment M' by means of the exit pipe K with its valve L, and taken to a proper receptacle for the storage of same, or to the place where it is to be used. The richness of the mixture produced can be regulated by the amount of air admitted to the first compartment C by means of the valve E.

In the modification shown in Figure 4 the construction is substantially the same as hereinbefore described, the same reference characters being applied to the drawing where the parts are unchanged. The units are, however, coupled up in a somewhat different manner. In this form we have shown the appartus as comprising three units, and the inlet pipe for the gas, designated D' and provided with its regulating valve E' is connected with the rotor suction chamber C² of the right hand unit. The gas space of the impregnation chamber M² is connected by pipe J² with the suction chamber C' of the next adjoining unit progressing towards the left, and the gas space of the chamber M' of this unit is connected by pipe J' with the suction chamber C of the final or left hand unit next succeeding. The final outlet for the gas in the shape of pipe K' provided with regulating valve L' is from the chamber M of the said last named unit.

Such an apparatus as shown in Figure 4 is particularly adapted for producing aerated or gasified solution, as for example in the carbonation of a saccharate solution in the manufacture of sugar, the method of operation being as follows:

The saccharate solution to be carbonated would be admitted into the machine through the feed pipe R and allowed to rise to the liquid level U, regulated by means of the exit pipe S'. Carbon dioxide ($CO_2$) would be admitted to the compartment C² by means of the pipe D' and controlled by the regulating valve E'. This carbon dioxide is entrapped by the vanes B² of the rotor in compartment C² with a definite proportion of saccharate solution and by the proper direction of rotation of the rotor, this gas and solution are commingled and passed toward the center of the rotor and into the interior of the perforated member F², thence along the axis of the machine and outward through the perforated member F² into the compartment M². Any gas not absorbed by the saccharate solution in this passage through the rotor and the perforated member, rises in the compartment M² and passes by means of the connecting pipe J² into the compartment C', this gas being entrapped by the vanes B' of the rotor in compartment C' together with a definite portion of solution from compartment M and commingled therewith and passed toward the center of the rotor into and through the perforated member F' into the compartment M'. Any carbon dioxide still not absorbed by the solution in this passage through the rotor and the perforated member, rises in the compartment M' and passes, by means of the connecting pipe J' into the rotor in compartment C. The gas and solution then repeat the above described cycle through the rotor in compartment C, and are passed into compartment M. In each succeeding cycle the saccharate solution is enriched by absorption of the carbon dioxide. A sufficient number of cells are used in series so that absorption of all the soluble gas is effected in the operation, and only the remaining insoluble gas which entered the feed pipe D' discharged through the exit pipe K' from compartment M. The saccharate solution admitted through the feed pipe R is partly carbonated by being commingled with carbon dioxide in the rotor in compartment C and passed into compartment M. It is then free to pass again into the rotor in said compartment C by means of the opening T in the lower portion of the partition H, or into the next compartment C' by means of the connecting pipe P. The solution as it passes from one compartment to the next, obtains a series of successive carbonations until it finally passes from the machine by means of the exit pipe S, which pipe also controls the level of the solution in all compartments of the machine. With a given rate of feed of solution through the pipe R, and a given rate of speed of the rotor, the degree of carbonation of the solution can be definitely controlled by means of the amount of carbon dioxide admitted through the gas inlet pipe D' controlled by its regulating valve E'. The direction of gas flow is indicated by the arrows shown in dotted lines and the solution flow by arrows in full lines.

It will be observed that in the apparatus shown in Figure 4, the solution passes in one direction, while the gas passes through in an opposite direction. By this means the fresh gas is brought into contact with the solution nearest the saturation point desired, while the weakest gas is brought into contact with the fresh solution. Thus a very strongly saturated solution can be discharged from the apparatus through the delivery pipe S, while a gas very weak in, or barren of carbon dioxide, can be discharged from the pipe K'. The carbon dioxide commonly used for the carbonation in saccharate work contains about 80 per cent of inert gas, mainly nitrogen, and this inert gas would pass from the machine through the pipe K' while the carbon dioxide itself is absorbed by the solution. The present practice in the manufacture of sugar from sugar beets is intermittent, and our invention provides a continuous process of carbonation, which is of great advantage.

The apparatus last described is also adapted to be used for producing anhydrous hydrochloric acid gas in place of the scrubbing towers now used for that purpose, by building the machine of suitable materials that would not be attacked by the moist hydrochloric acid gas, or by the strong sulphuric acid used. The process in brief would be as follows:

Moist hydrochloric acid gas as produced from salt and sulphuric acid would be introduced into the apparatus through the pipe D' Figure 4, and concentrated sulphuric acid through the feed pipe R. In passing through the apparatus from the gas inlet pipe D' to the gas outlet pipe K', the hydrochloric acid gas would become anhydrous hydrochloric acid gas and the concentrated sulphuric acid in passing through the apparatus from the feed inlet pipe R to the outlet pipe S would take up or absorb any water that was present in the moist hydrochloric acid gas.

This same apparatus could also be used as a scrubber for air, used in the ventilation of buildings to remove all dust particles and to produce a moist air free from dust and germs. In this case the dry, dust-laden air would be brought into the apparatus through the pipe D' and after being washed or scrubbed by passing through the apparatus would be discharged through the pipe K' as a clean, germ-free moist air. The water for the purification would be fed into the apparatus through the pipe R and discharged with its contents through the pipe S.

Having thus described our invention, what we claim is:

1. Liquid and gaseous contact apparatus comprising a tank having a pair of adjoining compartments, means for maintaining liquid in said compartments, a rotor mounted in one of said compartments on a horizontal axis and partly submerged in the liquid, said rotor having a tubular central portion and passages leading from the periphery to said tubular portion arranged to entrap liquid and gas and convey it to said portion, said tubular portion projecting into the other compartment beneath the liquid level therein.

2. Liquid and gaseous contact apparatus comprising a tank having a pair of adjoining compartments, means for maintaining liquid in said compartments, a rotor mounted in one of said compartments on a horizontal axis and partly submerged in the liquid, said rotor having a hollow reticulated part at its center and passages leading from its periphery to said hollow reticulated part whereby definite quantities of liquid and gas are entrapped in said passages and delivered into said reticulated part, said reticulated part being extended into the other compartment beneath the liquid level.

In testimony whereof, we affix our signatures.

RANDALL PORTER AKINS.
JOHN WILLIAM BUCHER.
FREDERICK DANIEL GROSS.